United States Patent [19]

Blount

[11] 4,235,767

[45] Nov. 25, 1980

[54] PROCESS FOR THE PRODUCTION OF HALOHYDRIN-AMINE-SILICATE RESINOUS PRODUCTS

[76] Inventor: David H. Blount, 5450 Lea St., San Diego, Calif. 92105

[21] Appl. No.: 56,907

[22] Filed: Jul. 12, 1979

Related U.S. Application Data

[60] Division of Ser. No. 938,450, Aug. 31, 1978, abandoned, which is a continuation-in-part of Ser. No. 732,013, Oct. 13, 1976.

[51] Int. Cl.$^3$ .............................................. C08L 79/02
[52] U.S. Cl. ............................ 260/37 EP; 260/37 N; 260/29.2 EP; 528/405; 528/422
[58] Field of Search ................... 260/37 EP, 29.2 EP, 260/37 N; 528/405, 422

[56] References Cited

U.S. PATENT DOCUMENTS

| | | | |
|---|---|---|---|
| 2,898,310 | 8/1959 | Greer | 260/2.1 |
| 3,493,502 | 2/1970 | Coscia | 210/54 |
| 3,520,774 | 7/1970 | Roth | 162/164 |
| 4,036,787 | 7/1977 | Blount | 260/2 S |
| 4,089,840 | 5/1978 | Blount | 260/46.5 R |
| 4,100,112 | 7/1978 | Blount | 260/185 |

OTHER PUBLICATIONS

Foster, "Sorption Hysteresis", Chemical Abstracts 45, 6894h (1951).
Ross et al., "The Sorption of Ethylamine on Silica and Silica Xerogel", Chemical Abstracts 64, 13428g (1966).

*Primary Examiner*—Earl A. Nielsen

[57] ABSTRACT

Halohydrin-amine-silicate resinous products may be produced by reacting various polyfunctional halohydrins, polyfunctional amine and silica compounds in an aqueous solution.

13 Claims, No Drawings

PROCESS FOR THE PRODUCTION OF HALOHYDRIN-AMINE-SILICATE RESINOUS PRODUCTS

CROSS-REFERENCE TO RELATED APPLICATIONS

This application is a divisional of U.S. patent application Ser. No. 938,450, filed Aug. 31, 1978 abandoned, which is a continuation-in-part of my copending application, Ser. No. 732,013, filed Oct. 13, 1976.

BACKGROUND OF THE INVENTION

This invention relates in general to the process for the production of halohydrin-amine-silicate resinous products be reacting a silica compound in an aqueous solution with a polyfunctional amine and a polyfunction halohydrin.

The various halohydrin-amine-silicate resinous products may be utilized as an adhesive, as an impregnant and water-resistant coating agent in the production of paper products, as a thermo-setting liquid resinous product which may be poured into molds of useful objects such as gears, knobs, art objects, washers, toys, etc., then heated to 80° to 120° C., thereby producing a hard, tough resinous product. These resinous products may also be used as coating agents, as fillers, as rubber-like materials, and may be copolymerized with other organic reactants.

In the process according to the invention, therefore, novel resinous products are produced from at least 3 components:
A. A silica compound
B. A polyfunctional amine
C. A polyfunctional halohydrin

COMPONENT A

Various silica compounds, silicates, silicates containing free silicic acid groups and silicates containing free silicon dioxide groups may be used in this invention. Various silica compounds such as hydrated silica, hydrated silica containing Si—H groups, and natural silicates containing free silicia acid groups may be used in this invention. Hydrated silica is the preferred silica compound. Various alkali silicates such as alkali metal silicates which include sodium silicate, potassium silicate, lithium silicate, and such as alkaline earth metal silicates which include calcium silicate, cadmium silicate, barium silicate, zinc silicate, magnesium silicate, aluminum silicate, etc., may be used in this invention. Mixtures of the above-named silicates may also be used.

Sodium silicate is the preferred silicate compound. Silica, hydrated silica and silicates with free silicic acid groups and/or free silicon oxide groups will react with the alkali compound in this process to produce an alkali silicate.

Some of the naturally occurring silicates that may be used in this invention are clay, kaolin, talc, asbestos, natrolite, mica, feldspar, beryl, etc., and mixtures thereof. The naturally occurring silicates may be treated with a dilute mineral acid to produce more active silicic acid groups present in the silicates.

COMPONENTS B

Various organic polyfunctional amine compounds may be used in this instant invention such as alkylenepolyamines, alkylenimines, arylenadiamines, alkyleneamines, aryleneamines, condensaation products often of an epihalohydrin and a poly(alkylene polyamine), ammonia, condensation products of epichlorohydrin and ammonia, hydrazine, alkanolamines, aminoethyl alkanolamine and mixtures thereof.

Various bifunctional alkyleneamines which may be used are methylamine, propylamine, isopropylamine, butylamine, amylamine, hexylamine and mixtures thereof. Vadrious bifunctional aryleneamines which may be used in this invention are aniline, toluidine amine, xylidine amine, benzylamine and mixtures thereof. Naphthylamine and vinyl amines may also be used. It is preferred, according to this invention, the use the alkyleneamines, aryleneamines, vinyl amines and naphthylamines with a polyamine such as alkylenepolyamines, arylenediamines and mixtures thereof. The ratio of the mono-amine to the polyamine may be quite varied.

The polyfunctional alkylenepolyamines which may be used in this invention are well known compounds corresponding to the formula

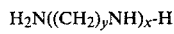

$$H_2N((CH_2)_yNH)_x\text{-}H$$

in which x is one or more and y is an integer having a value of 2 to 10. Typical amines of this class are the alkylenediamines such as ethylenediamine; 1,6-diamine-3-methyl-n-hexane; 1,3-propylenediamine; 1,4-diamino-n-butane; 1,6-diamine-n-hexane; 1,10-diamine-n-decane; and polyalkylenepolyamines such as diethylenetriamine, triethylenetetramine, tetraethylenepentamine and the corresponding polypropylenepolyamines and polybutylenepolyamines. Arylenediamines such as p-phenylenediamine and p,p'-bisaniline may be used. Arylenepolyamines may be used. Polyamide polymers with free amine radicals may be used in this instant process.

The alkylenepolyamines and arylenepolyamines are the preferred amines in this instant process.

Various organic compounds containing an amine radical may be used in this process such as aminocaproic acid, N-methylenediamine aminobenzoic acid, fatty acid amides, hydroxy amines, such as 1,3-diamine-2-propanol, and mixtures thereof, but it is preferred to use these with a polyamine compound.

The polyamines may first be reacted with dicarboxyl acids, dicarboxylic acid anhydrides, epoxide compounds, carbon disulfide, aldehydes, aliphatic dihalides, aliphatic trichlorides, ketones, epoxy resins, mono-olefinic alkyl type monohalides and mixtures thereof to produce a polymer with free amine groups and may be used in this process.

The organic polyamine compounds may be reacted chemically with silica, hydrated silica and hydrated silica with Si-H groups (silicoformic acid) to produce an organic polyamine silicate compound which then may be reacted with the polyfunctional halohydrin compound.

The starting polyamine may be of technical grade such as normally is available commercially which may contain a major proportion of one of such polyamines, especially di(hexamethylene) triamine with lesser amounts of the other polyamines.

The functionality of the amines used in the present invention is equal to the number of reactive amino hydrogens therein, that is, to the number of hydrogens which are attached to basic amino nitrogen atoms. Thus ethylenediamine has a functionality of 4, tetraethylenepentamine has a functionality of 7, and ammonia has a functionality of 3. Methylamine is bifunctional. The ratio of the polyfunctional polyamine and the bifunctional amine may be quite varied; the molar ratio may vary from 50:1 and 2:1. Epichlorohydrin has a functionality of 2.

The polyfunctional halohydrin and amine may be employed in partially prereacted form; for example, one mol of methylamine and two mols of epichlorohydrin are reacted, or 3 mols of epichlorohydrin and one mol of ammonia are reacted.

As bifunctional amines, there may be employed any water-soluble amine having two reactive amine hydrogen atoms. Methylamine, ethylamine, ethanolamine, propylamine, N,N'-dimethylenediamine, piperazine and aniline. Mixtures of two or more bifunctional amines may be used.

COMPONENT C

Various polyfunctional halohydrins may be used in this invention such as alphadichlorohydrin, dibromohydrin, di-iodohydrin, epichlorohydrin, epibromohydrin, glycidol, methyl epichlorohydrin, di-epi-iodohydrin, other halohydrins derived from glycerol in which one terminal hydroxy group is replaced by two halogen atoms, i.e., by chlorine, fluorine, bromine or iodine which may react with an alkali group to produce an epihalohydrin, and mixtures thereof. Epichlorohydrin is the preferred polyfunctional halohydrin.

The monohalohydrins should contain a second radical or group capable of reacting or promoting reaction with a polyamine such as the epihalohydrins.

An excess of the polyfunctional halohydrin may be added and is tolerated by the reaction.

The reaction converts substantially all the chlorine of the polyfunctional halohydrin to hydrogen chloride which tends to inhibit the reaction. It is advantageous to employ an acid acceptor so as to prevent the reaction from proceeding unduly slowly during the final phase. The alkali metal alkalis are suitable for the purpose. The chemical reaction between the silica and the amines and/or the polyfunctional halohydrin is enhanced by the presence of an alkali compound.

Various alkali compounds may be used in the process of this invention such as alkali metal hydroxides, alkali metal oxides, alkali metal carbonates, alkali metal salts of weak inorganic and organic acids, alkaline earth metal hydroxides, alkaline earth metal oxides, alkaline earth metal carbonates, alkaline earth metal salts of weak organic and inorganic acids and mixtures thereof.

Sodium hydroxide is the preferred alkali compound. Other useful alkali metal hydroxides include potassium hydroxide, lithium hydroxide. Useful alkali metal oxides include sodium carbonate, potassium carbonate and lithium hydroxide. Useful alkali metal oxides also include sodium oxide, potassium oxide and lithium oxide.

The preferred alkaline earth metal compound is calcium hydroxide. Useful alkali metal salts of weak acids include sodium silicate, sodium acetate, sodium oxalate, sodium salts of organic unsaturated or saturated dicarboxylic acids, sodium acrylate, sodium methacrylate, sodium polysulfide and mixtures thereof.

The addition of an alkali compound improves the physical properties of the halohydrin-amine-silicate copolymer by improving the tear resistance and, in some cases, improving the elasticity. The elastomer properties are improved by first reacting the alkali compound such as sodium hydroxide to produce a sodium amine compound; then the silica and polyfunctional halohydrin are added. The alkali compound is added to the aqueous solution to keep the pH in the range of 7 to 12. The alkali compound may be added in sufficient amount to react with the hydrogen chloride produced in the reaction of a halohydrin with an amine.

SUMMARY OF THE INVENTION

I have discovered that a polyfunctional halohydrin, a polyfunctional amine and a silica compound will react chemically in the presence of an aqueous solution to produce a halohydrinamine-silicate thermosetting resinous product.

The chemical reactions of this invention may take place under any suitable physical condition. While many of the reactions will take place acceptably at ambient temperature and pressure, in some cases, better results may be obtained at somewhat elevated temperature and pressure. Preferably, the reaction takes place at a temperature between 20° and 120° C. in a closed system. During the production of the liquid halohydrin-amine-silicate prepolymer, the temperature is preferably kept in the range of 20° to 70° C. The prepolymer is cured by heating it to above 80° C., usually between 80° and 120° C. Higher or lower temperatures may be used. The chemical reactions may take place at any suitable pH ranging from pH 5 to 12.

The reaction of the amine with the halohydrin is exothermic so that it is advantageous to employ cooling, at least while the halohydrin is reacting most vigorously. The reaction may be completed at an elevated temperature.

The preferred method to produce halohydrin-amine-silicate resinous products is to mix components A and B, then gradually add the polyfunctional halohydrin while agitating at a temperature between 20° and 70° C., then add water while agitating and keeping the temperature between 20° and 70° C. for 30 to 120 minutes, thereby producing a liquid, thermosetting halo-amino-silicate prepolymer. The temperature is then elevated to 80° to 120° C. for 5 to 30 minutes or until the liquid solidifies into a solid haloamine-silicate copolymer.

The components may be mixed in any suitable manner. They may be mixed simultaneously or each added separately in any order. Various components may be reacted together before adding to the aqueous solution, such as components A's being reacted with component B; component B may be reacted with component A or C; components A, B and C may be reacted together, then water is added and components A, B and C may be reacted together in an aqueous solution. Component A may be reacted with component B and C in an aqueous alkaline solution.

The amount of each component may be quite varied. The ratio of the mols of the polyamine (component B) to the polyfunctional halohydrin (component C) may vary from 1:0.5 to 1:5. The ratio of the parts by weight of the polyamine to the polyfunctional halohydrin may vary from 5:50 to 150:50 parts by weight. About 1 to 20 parts by weight of the alkali compound may be added to 50 parts by weight of the polyfunctional halohydrin (component C). About 10 to 50 parts by weight of the silica compounds (component A) are added to 50 parts by weight of the polyfunctional halohydrin (component C).

The amount of water used in this reaction may be quite varied, from 50 parts by weight to 500 parts by weight. Water appears to enter into the chemical reaction, and an amount about equal to the weight of the polyamine is utilized in the reaction. When an excess of water is used in an alkali aqueous solution, the halohydrin-amine-silicate will coagulate from the water and salt.

The chemical reactions of this invention may also take place in other solutions than water, such as glycols, glycerol and other polyhydroxy compounds. Water is preferred.

The products of this invention may range from a soft, flexible elastomer to a hard, tough, solid product. Any excess silica or silicate compound and salt may be used as a filler. The structure of the copolymer has not been ascertained. The halohydrin-amine-silicate copolymer may be produced as a thermoplastic or thermosetting copolymer. When the ratio of the polyfunctional halohydrin to the amine is greater than 1:1, the copolymer is usually themosetting. The more polyfunctional amine present, the more cross-linking can take place, thereby producing a thermosetting copolymer.

Various cross-linking or modifying compounds or resins may be added to improve the physical properties of the halohydrinamine-silicate resinous product, such as aliphatic dichlorides, aliphatic trichlorides, polyhydroxy compounds, polyamides, polysulfides, carbon disulfide, sulfur, dihydroxy phenols, lignin, organic dicarboxylic acids or dicarboxylic acid anhydrides, vegetable oils, vinyl monomers, organic dienes, phenoplasts, aminoplasts, furans, aldehydes, silicic aminoplasts, silicic phenoplasts, fatty or rosin acids, furan silicate polymers, furfuralketone resins, dibutyl phthalate, tricresyl phosphate, erasyl silicates, phenol silicates, styrene oxide, alkylene oxides, acetonitrile, primary aromatic sulfonamides, disecondary sulfonamides, epoxy compounds and resin, di(mono-hydroxy) alkanes, mono-olefinic allyl type monohalide and mixtures thereof.

Suitable polyhalogenated aliphatic compounds may be used to modify the halohydrin-amine-silicate copolymer, such as ethylene dichloride, chloroform, dichloromethane, methylene chloride trichloropropane.

Suitable polyhydric alcohols may be used to modify the halohydrin-amine-silicate copolymer, such as ethylene glycol; propylene 1,2- and -1,3-glycol; butylene-1,4- and -2,3-glycol; hexane-1,6-diol; octane-1,8-diol; neopentyl glycol; cyclohexanedimethanol-(1,4-bis-hydroxymethylcyclohexane); 2-methyl-propane-1,3diol; glycerol; trimethylol propane; hexane-1,2,6-triol; butane-1,2,4-triol; trimethylol ethane; resorcinol; pentaerythritol; quinitol; mannitol and sorbitol; methylglycoside; diethylene glycol; triethylene glycol; tetraethylene glycol; polyethylene glycols; dipropylene glycol; propylene glycol; dibutylene glycol; and polybutylene glycols. The polyesters containing 2 or more hydroxyl groups per molecule may be used. Polyethers with at least 2 hydroxyl groups per molecule may be used. Polythioethers, polyacetals, polycarbonates, polyester amids, castor oil, additional products of alkylene oxides with phenolformaldehyde resins and urea-formaldehyde resins with free hydroxyl groups may be used in this invention to modify the halohydrin-amine-silicate copolymer. The polyhydric alcohol is added in the amount of 10 to 20 parts by weight to 50 parts by weight of the polyfunctional halohydrin.

Di(mono-hydroxy) alkanes may be used to modify the halohydrin-amine-silicate copolymer, such as:
4,4'-dihydroxy-diphenyl-methane;
2,2'-(4-bis-hydroxy phenyl) propane;
1,1'-(4,4'-dihydroxy diphenyl) cyclohexane;
1,1'-(4,4'-dihydroxy-3,3'-dimethyl-diphenol) butane;
2,2'-(2,2'-dihydroxy-4,4'-di-tert-butyl-diphenyl) propane;
2,2'-(4,4'-dihydroxy-diphenyl) butane;
2,2'-(4,4'-dihydroxy-diphenyl) pentane;
3,3'-(4,4'-dihydroxy-diphenyl) pentane;
2,2'-(4,4'-dihydroxy-diphenyl) hexane;
3,3'-(4,4'-dihydroxy-diphenyl) hexane;
2,2'-(4,4'-dihydroxy-diphenyl)-4-methyl-pentane; (dihydroxy-diphenyl) heptane;
4,4'-(4,4'-dihydroxy-diphenyl) heptane;
2,2'-(4,4'-dihydroxy-diphenyl) tridicane;
2,2'-(4,4'-dihydroxy-3'-methyl-diphenyl) propane;
2,2'-(4,4'-dihydroxy-3-methyl-3'-isopropyl-diphenyl) betane;
2,2'-(3,5,3',5'-tetra-chloro-4,4'-dihydroxy-diphenyl) propane;
2,2'-(3,5,3',5'-tetra-bromo-4,4'-dihydroxy-diphenyl) propane;
(3,3'-dichloro-4,4'-dihydroxy-diphenyl)methane;
(2,2'-dihydroxy-5,5'-difluoro-diphenyl)methane;
(4,4'-dihydroxy-diphenyl)-phenyl-methane;
1,1'-(4,4'-dihydroxy-diphenyl)-1-phenyl-ethane;
1,1'-(4,4'-dihydroxy-diphenyl)-1-phenyl-ethane;

The di(mono-hydroxy)alkane may be added in the amount of 10 to 20 parts by weight to 50 parts by weight of the polyfunctional halohydrin.

An alkylene oxide may be reacted with the halohydrin-amine-silicate prepolymers produced by the process of this invention. The halohydrin-amine-silicate prepolymers are reacted with ethylene oxide or propylene oxide in an amount to provide an average of about 0.5 to 1.5 mols of the oxide per amine nitrogen atom in the prepolymer.

The alkylene oxide adducts of halohydrin-amine-silicate propolymers are produced by adjusting the pH of the prepolymer to 6 to 7 and a temperature of 45° to 85° C., then the ($C_2$–$C_3$)alkylene oxide is added in an amount of about 15% to 20% by weight of the prepolymer while the temperature is maintained between 45° and 85° C., preferably about 70° C. The oxide may be added in the form of a gas or a liquid under pressure. During the reaction, the viscosity of the product generally increases somewhat; its pH rises, and the product becomes soluble in highly alkaline systems, even up to a pH of about 14. Ethylene oxide is generally preferred. A mixture of ethylene oxide and propylene oxide may also be used. The structure of the copolymer is not known.

It is sometimes advantageous, before reacting the alkylene oxide with the halohydrin-amine-silicate prepolymer, to subject the prepolymer to a reducing agent or bleaching agent such as sodium formaldehyde sulfoxylate, sodium sulfite, or hydrosulfite, particularly when commercial polyamine mixtures are employed as the starting material. The amount of the reducing agent may very depending upon the particular reaction mixture. It may be from ½% to as much as 5% by weight, based on the weight of the prepolymer. The bleaching agent is added after the pH of the prepolymer in an aqueous solution has been adjusted to a pH of about 5.5 to 7. The mixture is heated for a period up to 1 to 2 hours at about 45° to 70° C. The alkylene oxide adducts of halohydrin-amine-silicate prepolymer may be treated with any of the reducing agents mentioned herein above in the same way as the halohydrin-amine-prepolymer.

The alkylene oxide adducts of halohydrin-amine-silicate prepolymer may be employed in the production of paper to enhance the deposition of mineral fillers and the imparting of wet strength to papers.

In the production of the halohydrin-amine-silicate prepolymer, it is preferred that the polyfunctional halohydrin is used in a proportion of 0.20 to 0.5 gram-mole thereof per 100 grams of the polyfunctional amine when it is to be reacted with an alkylene oxide.

The pH of the halohydrin-amine-silicate prepolymer when in an alkaline aqueous solution may be adjusted by the addition of an organic acid such as acetic acid, a mineral acid such as hydrochloric acid or sulfuric acid and hydrogen-containing-acid salts such as sodium hydrogen sulfate and potassium hydrogen sulfate.

The copolymers of the present invention are effective as retention aids in the manufacture of paper, in that when added to aqueous suspensions of cellulose paper-making fibers, they cause ultra-small particles of materials suspended therein to be deposited on the fibers. Among the ultra-small particles which are deposited in this way are pigments (for example, clay, silica, calcium carbonate, ultramarine and titanium dioxide), rosin size, emulsion particles, and the cellulose "fines" normally present in paper-making suspensions.

The copolymer may be used for the preparation of cationic emulsions intended for paper-making use. A non-ionic or weakly anionic emulsifying agent may be used in conjunction with the copolymer. Paper sizes such as higher fatty acid isocyanates, the higher fatty acid ketene dimers and the higher fatty acid anhydrides and petrolatum and wax may be emulsified with the halohydrin-amine-silicate prepolymer. Impregnating agents which can be emulsified and applied to cellulose fibers in this way include asphalt and petroleum tar. The resulting emulsions, being cationic and cellulose-substantive, are likewise added to cellulose pulp in the preparation of papers. The unreacted silica may be reacted with alkali metal hydroxides to produce alkali metal silicate and may be used in the preparation of paper.

The reaction of the halohydrin-amine-silicate prepolymer may be stopped by the addition of an acid such as glacial acetic acid until the pH is about 4.5 and cooled to room temperature.

The halohydrin-amine-silicate prepolymer may be used as a thermosetting copolymer, especially the copolymer produced in an alkali aqueous solution, utilizing 1 to 2 mols of epichlorohydrin to 1 mol of an alkylenediamine such as hexamethylene diamine. The halohydrin-amine-silicate copolymer produced is very tough and hard. It is useful to produce gears, pulleys, handles, toys, bushings, etc.

The halohydrin-amine-silicate prepolymer may be used to impregnate cloth, fiberglass cloth, wire mesh, etc., then heated to produce the thermosetting copolymer. It may be used as an adhesive or coating agent for wood.

The primary object of this invention is to produce a halohydrin-amine-silicate prepolymer which can be further heated to produce a halohydrin-amine-silicate copolymer. Another object of this invention is to produce a halohydrin-amine-silicate prepolymer which can be molded into useful objects by heat.

DESCRIPTION OF PREFERRED EMBODIMENTS

My invention will be illustrated in greater detail in the specific Examples which follow, which detail preferred embodiments of my process. It should be understood that the scope of my invention is not limited to the specific processes set out in the Examples. Parts and percentages are by weight, unless otherwise indicated.

EXAMPLE 1

About 2 parts by weight of fine granular hydrated silica and 2 parts by weight of ethylenediamine are mixed; then 3 parts by weight of epichlorohydrin are slowly added while agitating and keeping the temperature between 20° and 70° C.; then about 5 parts by weight or water are added and thoroughly mixed. The mixture is then heated to 80° to 120° C. while agitating for 15 to 60 minutes or until the mixture solidifies, thereby producing a halohydrin-amine-silicate copolymer.

EXAMPLE 2

About 2 parts by weight of fine granular hydrated silica containing enough sodium hydrogen sulfate to give a pH of about 5.5 in water and 2 parts by weight of diethylenetriamine are mixed; then 3 parts by weight of epichlorohydrin are slowly added while agitating and keeping the temperature between 20° and 70° C. while agitating for 15 to 120 minutes. About 4 parts by weight of water are added to the mixture, then heated to 80° to 120° C. while agitating for 15 to 60 minutes or until the mixture solidifies, thereby producing a solid elastomer halohydrin-amine-silicate copolymer.

EXAMPLE 3

About 2 parts by weight of fine granular hydrated silica with Si-H groups (silicoformic acid) and 2 parts by weight of propylene-diamine are mixed; then 2.5 parts by weight of epichlorohydrin are slowly added to the mixture while agitating at ambient pressure and keeping the temperature between 20° and 70° C. for 15 to 120 minutes. About 6 parts by weight of water are added to the mixture, then heated to 80° to 120° C. while agitating for 15 to 60 minutes until a thick liquid halohydrin-amine-silicate prepolymer is produced. The prepolymer is then poured into a mold, then heated to 80° to 120° C. for a few minutes or until the mixture solidifies, thereby producing a solid, flexible halohydrin-amine-silicate copolymer.

EXAMPLE 4

About 1.5 parts by weight of fine granular hydrated silica, 2 parts by weight of triethylenetetramine and 2 parts by weight of water are mixed; then 2 parts by weight of epichlorohydrin are slowly added while agitating and keeping the temperature between 20° and 70° C. for 15 to 20 minutes, thereby producing a halohydrin-amine-silicate prepolymer. The thermosetting prepolymer is then heated to 80° to 120° C. for 15 to 120 minutes, thereby producing a solid halohydrin-amine-silicate copolymer.

EXAMPLE 5

Components A and B are added to 2 parts by weight of water containing 0.25 part by weight of sodium carbonate; then component C is slowly dried over a period of 15 to 120 minutes while agitating and keeping the temperature between 20° and 70° C., thereby producing a halohydrin-amine-silicate prepolymer. The prepolymer is then heated to 80° to 120° C. for 1 to 60 minutes, thereby producing a solid halohydrin-amine-silicate copolymer.

Component A: 2 parts by weight of hydrated silica

Component B: 2 parts by weight of propylenediamine
Component C: 3 parts by weight of epichlorohydrin

EXAMPLE 6

The same procedure used as in Example 5, with change in components.
Component A: 1 part by weight of hydrated silica
Component B: 2 parts by weight of diethylenetriamine
Component C: 2.5 parts by weight of epichlorohydrin

EXAMPLE 7

Components A, B and C are simultaneously added to 3 parts by weight of an aqueous solution containing 1 part by weight of sodium hydroxide flakes. Components A and B go into the solution while agitating, but the epichlorohydrin slowly goes into solution while keeping the temperature between 50° and 70° C. The mixture is agitated for 15 to 120 minutes, thereby producing a halohydrin-amine-silicate prepolymer.

The prepolymer is then diluted with water until it contains about 5% of the prepolymer and is added to a 1% water suspension of bleached kraft paper pulp, followed by forming the treated stock into handsheets, then heating for 1 to 15 minutes at 110° C., thereby producing a thermo-set halohydrin-amine-silicate copolymer adhesive on the paper pulp.
Component A: 1 part by weight of hydrated silica
Component B: 2 parts by weight of tetraethylenepentamine
Component C: 2 parts by weight of epichlorohydrin Also 5–10% of resins such as coumarone resin, polyindene resin, phenolic resins, residue from rosin purification, and polystyrene resin may be added to the diluted halohydrin-amine-silicate prepolymer aqueous solution.

EXAMPLE 8

The same procedure as in Example 7 with change in components.
Component A: 1.5 parts by weight of hydrated silica
Component B: 2 parts by weight of ethylenediamine
Component C: 2.5 parts by weight of epichlorohydrin

EXAMPLE 9

The same procedure as in Example 7 with change in components.
Component A: 1 part by weight of hydrated silica
Component B: 2 parts by weight of tetraethylenepentamine
Component C: 3 parts by weight of dichlorohydrin

EXAMPLE 10

The same procedure as in Example 7 with change in components.
Component A: 3 parts by weight of hydrated silica
Component B: 2 parts by weight of triethylenetetramine
Component C: 2.5 parts by weight of epichlorohydrin

EXAMPLE 11

2 parts by weight of Component A and 2 parts by weight of Component B are added to 3 parts by weight of water; then 3 parts by weight of Component B are added slowly with agitation while maintaining the temperature at about 20° C. Then 1 part by weight of 97% sodium hydroxide in 3 parts by weight of water is slowly added while agitating for about 2 hours, thereby producing a halohydrin-amine-silicate prepolymer. The prepolymer is then heated to 80° to 120° C. for 1 to 15 minutes, thereby producing a solid halohydrin-amine-silicate copolymer.
Component A: silica
Component B: diethylenetriamine
Component C: alphadichlorohydrin

EXAMPLE 12

The same procedure as in Example 11 with change in components.
Component A: 1 part by weight of silica 1 part by weight of hydrated silica
Component B: 1 part by weight of ethylamine 1 part by weight of hexamethylenediamine
Component C: 3 parts by weight of epichlorohydrin

EXAMPLE 13

The same procedure as in Example 12 with change in components:
Component A: Mixture of hydrated silica and silicoformic acid
Component B: 0.5 part by weight of propylamine 1.5 parts by weight of dipropylenetriamine
Component C: 3 parts by weight of epichlorohydrin

EXAMPLE 14

Silica is reacted with sodium hydroxide in an aqueous solution to produce sodium silicate (Component A). 2 parts by weight of Component A are mixed with 2 parts by weight of Component B; then 3 parts by weight of Component C are slowly added while agitating and keeping the temperature between 20° and 70° C.; then 5 parts by weight of water are added, and the mixture is then agitated at 50° to 70° C. for 15 to 120 minutes, thereby producing a halohydrin-amine-silicate prepolymer. The prepolymer is then heated to 80° to 120° C. for 1 to 15 minutes, thereby producing a solid elastomer, halohydrin-amine-silicate copolymer.
Component A: sodium silicate
Component B: ethylenediamine
Component C: epichlorohydrin

EXAMPLE 15

The same procedure as in Example 14 with change in components.
Component A: sodium silicate (dry granular)
Component B: technical grade of poly (hexamethylene) polyamine containing a major proportion of di(hexamethylene)triamine
Component C: epichlorohydrin

EXAMPLE 16

The same procedure as in Example 14 with change in components.
Component A: sodium silicate (dry granular)
Component B: 0.5 part by weight of methylamine 0.5 part by weight of propylenediamine 1.5 parts by weight of diethylenetriamine
Component C: 3 parts by weight of epichlorohydrin

EXAMPLE 17

Component A: 2 parts by weight of hydrated silica
Component B: 1.5 parts by weight of ethylamine 1 part by weight of ammonia as a 28% aqueous solution Component C: 3 parts by weight of epichlorohydrin Components A and the ethylamine of Component B are mixed; then epichlorohydrin is slowly added while agitating and keeping the temperature between 20° and 70° C.; then the ammonia (28% aqueous solution) of Component B is added while agitating and keeping the temperature at 50° to 70° C., thereby producing a halohydrin-amine-silicate prepolymer. The prepolymer is then heated to 80° to 120° C. for 1 to 15 minutes, thereby producing a solid halohydrin-amine-silicate copolymer.

EXAMPLE 18

Component A: 3 parts by weight of hydrated silica

Component B: 1 part by weight of diethylenetriamine 1 part by weight of aniline 1 part by weight of methylamine in 40% aqueous solution Component C: 3 parts by weight of epichlorohydrin Components A and B are mixed, then Component C is slowly added while keeping the temperature between 20° and 70° C. while agitating. About 4 parts by weight of an aqueous solution of sodium hydroxide containing 0.5 part by weight of sodium hydroxide are added while agitating, and the temperature is kept between 50° and 70° C. for 30 to 120 minutes, thereby producing a halohydrin-amine-silicate prepolymer. The prepolymer is then heated while agitating to 80° to 120° C. for 5 to 30 minutes, thereby producing a solid halohydrin-amine-silicate copolymer.

EXAMPLE 19

Component A: 1.5 parts by weight of hydrated silica

Component B: 3 parts by weight of technical grade of poly (hexamethylene) polyamine containing about 50% by weight of bis (hexamethylene) triamine, 35% of higher-molecular-weight polamine and about 10% mixture of hexamethylenediamine, adiponitrile, $\epsilon$-aminocapronitrile and 2-cyanocyclopentylidenimine.

Component C: 0.5 part by weight of epichlorohydrin

Component A and Component B are mixed, then Component C is slowly added while agitating and keeping the temperature between 20° and 70° C., then 4 parts by weight of water are added and mixed thoroughly. About 1 part by weight of 50% sodium hydroxide is slowly added to the mixture while agitating, and the mixture is kept at a temperature of 45° to 70° for 30 to 120 minutes, thereby producing a halohydrin-amine-silicate prepolymer.

To about 30 parts by weight of the aqueous prepolymer, containing about 25% halohydrin-amine-silicate prepolymer, is added 25% sulfuric acid until the pH is 6.5; then in a closed system, equipped with a fast stirrer, about 10 parts by weight of ethylene oxide are added by evaporation over a period of seven hours at a pressure of 0 to 15 cm. of mercury above atmospheric pressure and at a temperature of 45° to 70° C. The reaction is completed when all the ethylene oxide is consumed and a negative pressure is maintained in the system at 70° C., thereby producing an alkylene oxide-halohydrin-amine-silicate copolymer.

EXAMPLE 20

About 4 parts by weight of the halohydrin-amine-silicate prepolymer in an aqueous solution, containing about 25% prepolymer as produced in Example 19 and having a pH of about 6.5, is added to a closed system; then about 1 part by weight of propylene oxide is slowly added over a three-hour period while agitating and keeping the temperature between 45° and 70° C., thereby producing an alkylene oxide-halohydrin-amine-silicate copolymer.

EXAMPLE 21

Component A: 1 part by weight of hydrated silica

Component B: 2 parts by weight of hexamethylenediamine

Component C: 2 parts by weight of epichlorohydrin

Components A, B and 1 part by weight of sodium hydroxide flakes are mixed; then 1 part by weight of epichlorohydrin is slowly added while agitating and keeping the temperature between 20° and 70° C.; then 6 parts by weight of water are added while agitating. One part by weight of epichlorohydrin is slowly added while agitating and keeping the temperature between 50° and 70° C. for 30 to 120 minutes, thereby producing a halohydrin-amine-silicate prepolymer. The prepolymer is then heated to 80° to 120° C. for 5 to 15 minutes, thereby producing a tough, rubbery, solid halohydrin-amine-silicate copolymer.

EXAMPLE 22

Component A: 2 parts by weight of dry granular sodium silicate

Component B: 2 parts by weight of ethylenediamine

Component C: 3 parts by weight of epichlorohydrin

Component A is mixed with Component B; then Component C is slowly added while agitating and keeping the temperature between 20° and 70° C.; then 5 parts by weight of water are added. The mixture is then heated to 50° to 70° C. while agitating for 80 to 120 minutes, thereby producing a halohydrin-amine-silicate prepolymer. The prepolymer is then heated to 80° to 120° C. for 5 to 15 minutes, thereby producing a rubbery, solid halohydrin-amine-silicate copolymer.

EXAMPLE 23

Component A: 2 parts by weight of hydrated silica

Component B: 2 parts by weight of diethylenetriamine

Component C: 8 parts by weight of epichlorohydrin

Components A, B, 2 parts by weight of sodium hydroxide flakes and 3 parts by weight of 1,4-butanediol are mixed; then 8 parts by weight of epichlorohydrin are slowly added while agitating and keeping the temperature between 20° and 70° C. The mixture is then slowly added to 15 parts by weight of water while agitating. The temperature is then kept between 50° and 70° C. while agitating for 30 to 120 minutes, thereby producing a halohydrin-amine-silicate prepolymer. The prepolymer is then heated to 80° to 120° C. for 5 to 15 minutes, thereby producing a reddish-brown, elastic, solid halohydrin-amine-silicate copolymer.

EXAMPLE 24

The same procedures are followed as in Example 23 except that polyethylene glycol (average mol. wt. 420) is used as the polyhydroxyl polymer in place of 1,4-butanediol, thereby producing an elastic, solid halohydrin-amine-silicate copolymer.

EXAMPLE 25

Component A: 2 parts by weight of hydrated silica

Component B: 2 parts by weight of diethylenetriamine

Component C: 4 parts by weight of epichlorohydrin 2 parts by weight of sodium hydroxide flakes and 2 parts by weight of sulfur are heated while agitating to above the melting temperature of sulfur for 10 to 20 minutes, thereby producing sodium polysulfide granules. To the sodium polysulfide, Components A and B are added, and the mixture is heated to about 70° C. while agitating for 10 to 20 minutes. About 15 parts by weight of water are added while agitating, and the mixture goes into solution. Component C is slowly added while agitating and keeping the mixture between 20° and 70° C. for 30 to 120 minutes, thereby producing a yellow, elastic, solid polysulfide-halohydrin-amine-silicate copolymer.

EXAMPLE 26

Component A: 2 parts by weight of hydrated silica
Component B: 3 parts by weight of dipropylenetriamine
Component C: 5 parts by weight of epichlorohydrin
Components A, B, 3 parts by weight of a di(mono-hydroxy) alkane (4,4'-dihydroxy-diphenyl-methane) and 1 part by weight of potassium hydroxide are mixed; then Component C is slowly added while agitating and keeping the temperature between 20° and 70° C.; then 10 parts by weight of water are added, and the mixture is then heated to 50° to 70° C. while agitating for 30 to 120 minutes, thereby producing halohydrin-amine-silicate prepolymer. The prepolymer is then heated to 80° to 120° C. for 5 to 15 minutes, thereby producing a solid halohydrin-amine-silicate copolymer.

Any other di(mono-hydroxy) alkane listed in the Specification may be used in place of the 4,4'-dihydroxy-diphenyl-methane.

EXAMPLE 27

Component A: 2 parts by weight of hydrate silica
Component B: 2 parts by weight of diethylenetriamine
Component C: 2 parts by weight of epichlorohydrin
1 part by weight of ethylene dichloride
Components A, B and 2 parts by weight of sodium hydroxide are mixed, then Component C is slowly added while agitating and keeping the temperature between 20° and 70° C.; then 6 parts by weight of water are added to the mixture. The mixture is then heated to 50° to 70° C. for 30 to 120 minutes, thereby producing a halohydrin-amine-silicate prepolymer.

The prepolymer is then heated to 80° to 120° C. for 5 to 15 minutes, thereby producing a solid halohydrin-amine-silicate copolymer.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

I claim:

1. The process for the production of silica containing copolymer compositions by the following steps:

(a) mixing 10 to 50 parts by weight of a hydrated silica compound and 5 to 150 parts by weight of a polyfunctional amine;
(b) adding slowly 50 parts by weight of a polyfunctional halohydrin compound to said mixture while agitating and keeping the temperature between 20° C. and 70° C.;
(c) adding 50 to 500 parts by weight of water to the mixture while agitating and keeping the temperature between 20° C. and 70° C. for 30 to 120 minutes, thereby
(d) producing a silica containing prepolymer;
(e) adding an alkylene oxide, selected from the group consisting of ethylene oxide, propylene oxide and mixtures thereof, to the prepolymer in an aqueous solution containing about 25% aolids, at a temperature of 45° C. to 70° C., at a pH of 6 to 7, and with the proportion of alkylene oxide being from about 0.5 to 1.5 mols per mol of amino nitrogen atom in the halohydrin-amine-silicate prepolymer, while agitating, and
(f) maintaining the temperature until the alkylene oxide has reacted.

2. The process of claim 1 wherein the polyfunctional amine is selected from the group consisting of alkylenepolyamines, polyalkylenepolyamines, p,p-bisaniline, ammonia and mixtures thereof.

3. The process of claim 1 wherein the polyfunctional halohydrin is selected from the group consisting of alphadichlorohydrin, dibromohydrin, di-iodohydrin, epichlorohydrin, epibromohydrin, methyl epichlorohydrin, di-epiodohydrin and mixtures thereof.

4. The process of claim 1 wherein the polyfunctional halohydrin is epichlorohydrin.

5. The process of claim 1 wherein a bifunctional amine is added in step (a) of claim 1 and is selected from the group consisting of methylamine, ethylamine, propylamine, ethanolamine, N,N'-dimethylenediamine, piperazine, aniline and mixtures thereof, in molar ratio, bifunctional amine to polyfunctional amine varying from 50:1 to 2:1.

6. The process of claim 1 wherein a polychlorinated aliphatic compound is added in step (a) of claim 1 in the amount of 10 to 50 parts by weight per 50 parts by weight of the polyfunctional halohydrin.

7. The process of claim 1 wherein an organic polyhydroxy compound is added in step (a) of claim 1 in the amount of 10 to 20 parts by weight of the polyfunctional halohydrin.

8. The process of claim 1 wherein an alkali compound is added to the aqueous solution, step (c), until the pH is 7 to 12 and the alkali compound is selected from the group consisting of sodium hydroxide, potassium hydroxide, sodium carbonate, potassium carbonate and mixtures thereof.

9. The product produced by the process of claim 1.
10. The product produced by the process of claim 5.
11. The product produced by the process of claim 6.
12. The product produced by the process of claim 7.
13. The product produced by the process of claim 8.

* * * * *